(12) United States Patent
Remer

(10) Patent No.: US 7,725,977 B2
(45) Date of Patent: Jun. 1, 2010

(54) REMOTELY ACTUATED SURFACE PREPARATION DEVICE

(75) Inventor: Gary A. Remer, 27299 Highland Rd., Richmond Heights, OH (US) 44143

(73) Assignee: Gary A. Remer, Richmond Heights, OH (US)

( * ) Notice: Subject to any disclaimer, the term of this patent is extended or adjusted under 35 U.S.C. 154(b) by 0 days.

(21) Appl. No.: 11/796,877

(22) Filed: Apr. 30, 2007

(65) Prior Publication Data

US 2007/0251036 A1    Nov. 1, 2007

Related U.S. Application Data

(60) Provisional application No. 60/795,984, filed on Apr. 28, 2006.

(51) Int. Cl.
*A47L 1/02* (2006.01)
(52) U.S. Cl. ......................... 15/103; 15/220.2
(58) Field of Classification Search ............ 15/220.2, 15/1.7, 97.1, 103; 119/264, 245
See application file for complete search history.

(56) References Cited

U.S. PATENT DOCUMENTS 3,825,970 A * 7/1974 Hanssen ............. 15/230.11
3,983,591 A   10/1976 Ohtaki et al.
5,575,035 A * 11/1996 Reis et al. ............. 15/324
6,206,978 B1 * 3/2001 Tsui ....................... 134/8
6,634,052 B2  10/2003 Hanson
6,988,290 B2   1/2006 Enoch, III et al.
7,313,840 B2 * 1/2008 Watkins ............... 15/103

FOREIGN PATENT DOCUMENTS

JP    09-224881    *   9/1997

OTHER PUBLICATIONS

Computer generated English translation of JP 09-224881, Katase, Sep. 2, 1997.*
International Search Report Apr. 14, 2008.

* cited by examiner

*Primary Examiner*—Laura C Guidotti
(74) *Attorney, Agent, or Firm*—Fay Sharpe LLP (57) ABSTRACT

A remote surface preparation device for preparing a remote surface, such as cleaning the inside surface of an aquarium tank from the outside is provided. The device includes a remotely actuated surface preparation assembly having a body with at least one magnetic element for coupling it for remote actuation to complimentary magnetic elements in a moving drive head disposed at some distance therefrom. The device includes an adjustment mechanism which can vary the magnitude of the magnetic forces coupling the remote surface preparation assembly to the device, even during device operation.

22 Claims, 6 Drawing Sheets

REMOTELY ACTUATED SURFACE PREPARATION DEVICE

This application claims the benefit of U.S. Provisional Application No. 60/795,984 filed Apr. 28, 2006 which is hereby incorporated herein by reference in its entirety.

BACKGROUND OF THE INVENTION

Illustrated herein are embodiments of a remotely actuated surface preparation device, and more specifically, a powered, hand held device for cleaning interior surfaces of fluid tanks from outside the tank.

It is often necessary or convenient to clean the inside walls of fluid-filled tanks from the outsides of such tanks. This avoids the need for the cleaning personnel to enter the fluid-filled tank. While this task is frequently encountered in large-scale industrial tanks in the food, chemical, drug, and other industries, the task's difficulties also occurs in cleaning a home aquarium tank.

Aquariums are designed to host aquatic life in a natural and attractive manner. Maintaining an attractive aquarium requires regular care and cleaning to achieve this goal. The walls of aquariums accumulate algae, including hard coralline algae, and this needs to be removed with the least amount of disturbance to the aquarium's inhabitants to maintain an attractive view.

The present invention contemplates a remote surface preparation device that resolves the above-referenced problems and others.

SUMMARY OF THE INVENTION

According to the present invention, a remote surface preparation device having an adjustment mechanism for varying the magnitude of magnetic coupling forces reaching a remote surface preparation assembly disposed at some distance from a drive head of the device is provided.

In accordance with a first aspect of the invention, the surface preparation device includes a remotely actuated surface preparation assembly having a body with at least one magnetic element and a first end for contacting a first surface for preparing the first surface, a base having one or more support surfaces for contacting a second surface disposed opposite and space apart from the first surface, a drive head having at least one drive head magnetic element providing a magnetic coupling force for attracting the surface preparation assembly to the drive head for remote actuation, and an adjustment mechanism having first and second adjustment surfaces cooperating to vary the distance between the one or more support surfaces and the at least one drive head magnetic element.

BRIEF DESCRIPTION OF THE DRAWINGS

The drawings are only for purposes of illustrating preferred embodiments and are not to be construed as limiting the invention. The invention may take form in various components and arrangements of components, and in various steps and arrangements of steps, preferred embodiments of which will be illustrated in the accompanying drawings wherein.

DETAILED DESCRIPTION OF THE PREFERRED EMBODIMENTS

It is to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting.

Figure 1:
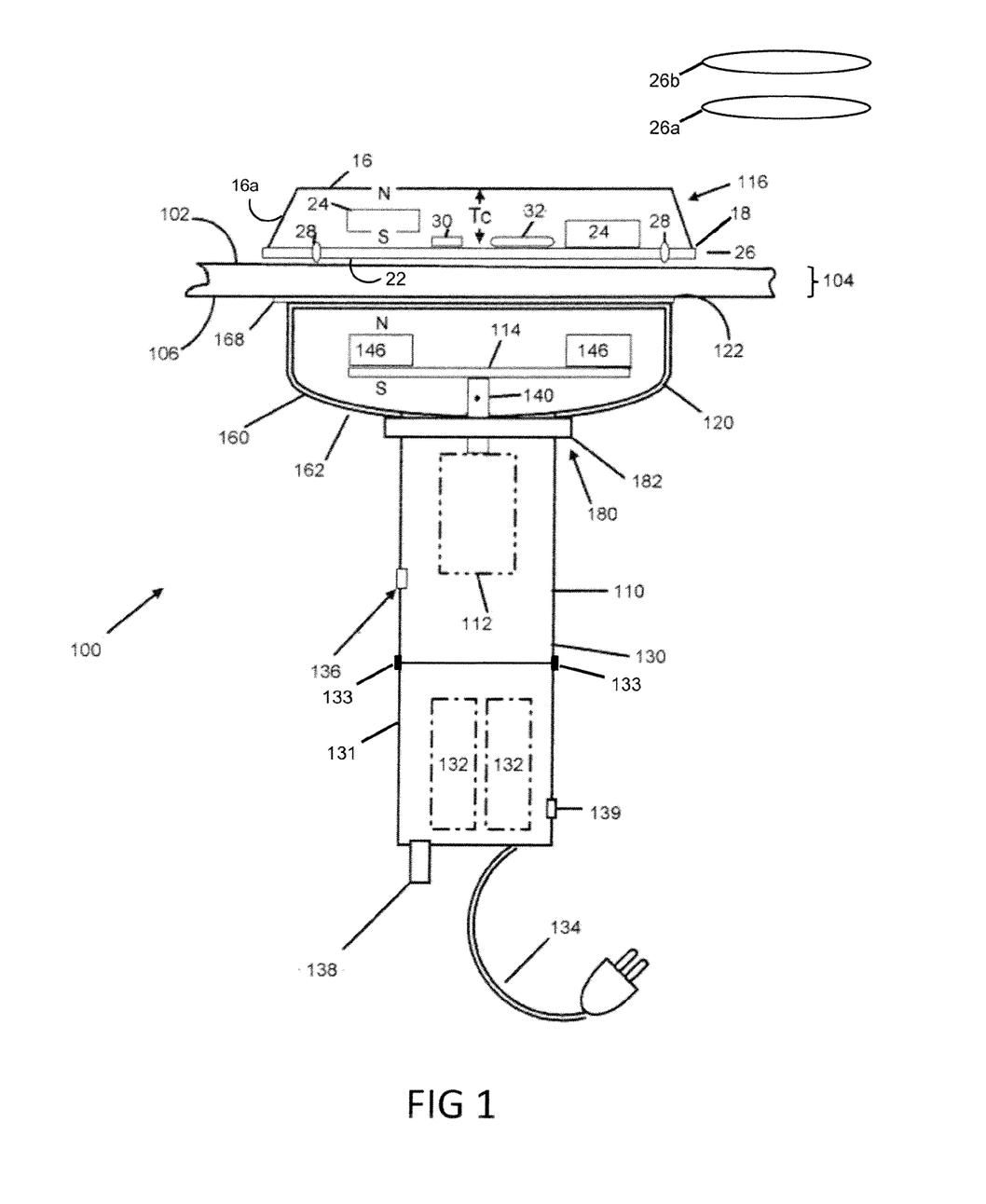
FIG. 1 is a side view of a remote surface preparation device.

Referring now to FIG. 1, a surface preparation device shown generally at 100 enables a user to prepare a remote surface 102 separated by one or more materials 104 from a spaced apart and oppositely disposed proximate surface 106. As an example which should not be considered as limiting, the device 100 enables an aquarium tank interior surface 102 to be cleaned by moving the device along the exterior surface of the tank 106. It should be appreciated that the terms "surface preparation", "preparing a surface", etc. can mean cleaning, polishing, sanding, grinding, and cutting the surface, among other like actions which can be contemplated using the device as disclosed herein.

The surface preparation device 100 includes a body 110 having motor 112 for moving a drive head 114 that is magnetically coupled through the one or more materials 104 to a remote surface preparation assembly 116 disposed against the remote surface 102. The surface preparation device 100 also includes a base 120 providing a support surface 122 for supporting the device against the proximate surface 106 as it is pressed against, and moved along, the proximate surface when preparing the remote surface 102. The device 100 enables the user to adjust the amount of the magnetic coupling that couples the remote surface preparation assembly 116 to the drive head 114 as shall be described in further detail below.

The remote surface preparation assembly 116 includes a body 16 having a first end 18 having an application surface 22 for contacting the remote surface 102 for surface preparation. The remote surface preparation assembly 116 includes one or more coupling elements 24 disposed within the body 16 to provide a magnetic coupling force attracting coupling elements 146 disposed in the drive head 114, as described in further detail below, to couple the assembly to the drive head for remote actuation against the remote surface 102. The coupling elements 24 and 146 can both be magnets, which can include, for example neodium, or other rare earth magnets, among others, disposed such that their complimentary poles are facing towards each other to attract each other, as shown in the embodiments described in further detail below. However, it should be appreciated that one or more of the coupling elements, 24 or 146 can be magnets and the other coupling elements, 146 or 24, can be ferrous materials, such as iron, steel, or the like, to magnetically couple the remote surface preparation assembly 116 with the drive head 114 for remote actuation.

Different applicators, one of which is shown at 26, can be fastened to the first end 18 to provide different application surfaces 22 to achieve specific surface preparation results. For example, an applicator 26a having a coarser surface can be used to remove coralline algae buildup in an aquarium in a first cleaning step, then an applicator 26b having a finer surface can be used for a second cleaning step to follow.

The remote surface preparation assembly body 16 can be water-resistant for use in a liquid environment, such as in an aquarium tank. For example it can be made of made from plastic, polypropylene, rubber, wood, among other materials. Further, the body 16 can be hollow and can include certain electronic components therein, such as for example, one or more LEDs 28 extending from the body so as to be viewable as the assembly 116 operates. The LEDs 28 can be powered by a battery 30 and operable by a switch 32, so as to provide light to assist in cleaning as well as being aesthetically pleasing to the user.

The remote surface preparation assembly body 16 can be disk-shaped to reduce unwanted turbulence within the tank that can kick up sediment, among other things. The body 16 can have a thickness $T_C$ at its center with tapered, radially outer ends 16a of reduced thickness. The tapered outer ends 16a can be tapered to form a curved outer end, or they can have flat surfaces tapered at an angle, or other suitable tapered shapes can be used. The tapered outer ends 16a further reduces turbulence as the disk rotates against the remote surface 102 in the liquid, and will also reduce drag on disk 116 as it moves through the liquid to facilitate its use in such environments.

The device body 110 can include a housing 130 formed of plastic, metal or other suitable materials. The body can also be considered as a hand-held power source, similar to a hand held drill or power screwdriver or other powered rotary tools that allows for attachment of the base and connection of the drive head assembly 114. The body 110 can include a handle portion 131 for gripping the device 100 during operation. Additionally, the body 110 can include a pivot point 133 to allow adjustment between the handle portion 131 and the drive head 114.

The motor 112 can be an AC or DC motor and is preferably mounted within the housing 130, though it can be disposed external thereto. The motor 112 is powered by one or more batteries 132 disposed in the housing and/or via a power cord 134 connected to one or more external batteries or a source AC power such as an AC outlet. The batteries 132 can be rechargeable if so desired. A jack 139 can be provided on the body housing 130 to connect an external power source to the device 110, including but not limited to an external transformer for converting AC power from an outlet into DC power for powering a DC motor 112. An on/off switch 136 can mounted to the housing 130 for completing an electrical circuit between the power source and the motor 112 in a conventional manner. Further, a rheostat 138 or other suitable component can be connected in the electrical circuit to vary the speed of the motor 112 within a suitable rpm range, such as for example between about 50 rpm and 300 rpm, though it should be appreciated the speed of the motor could be varied within a smaller or greater range if so desired.

Figure 2:
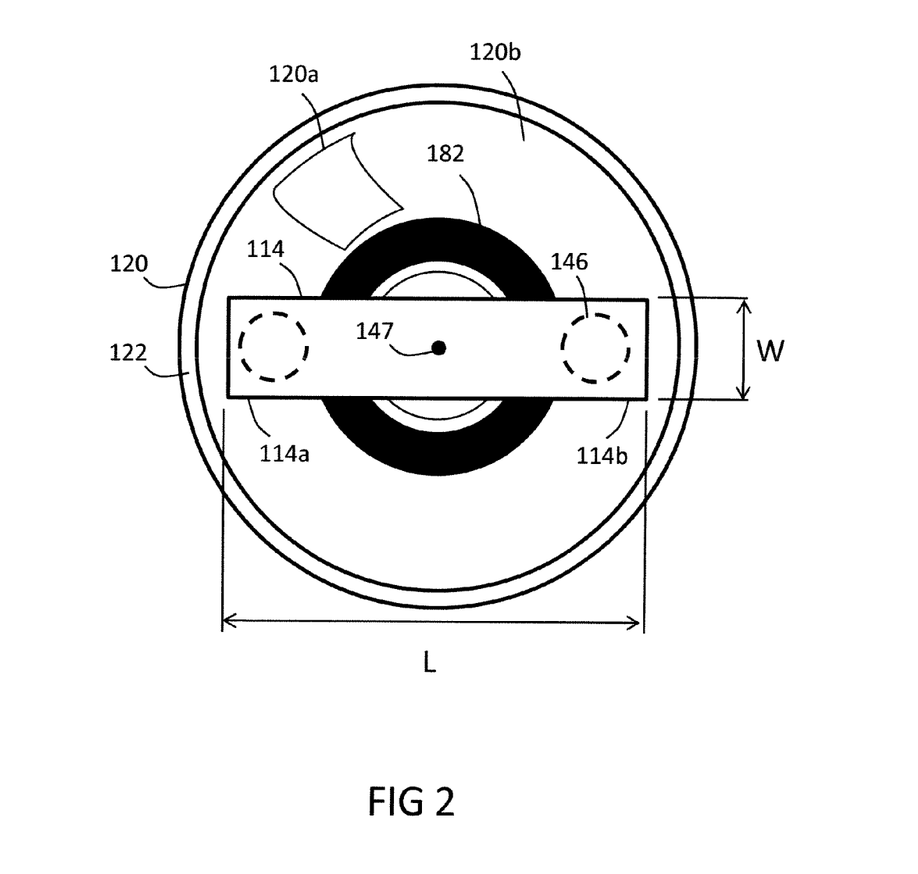
FIG. 2 is a bottom view of the remote surface preparation shown in FIG. 1 as viewed from a proximate surface.
Figure 3:
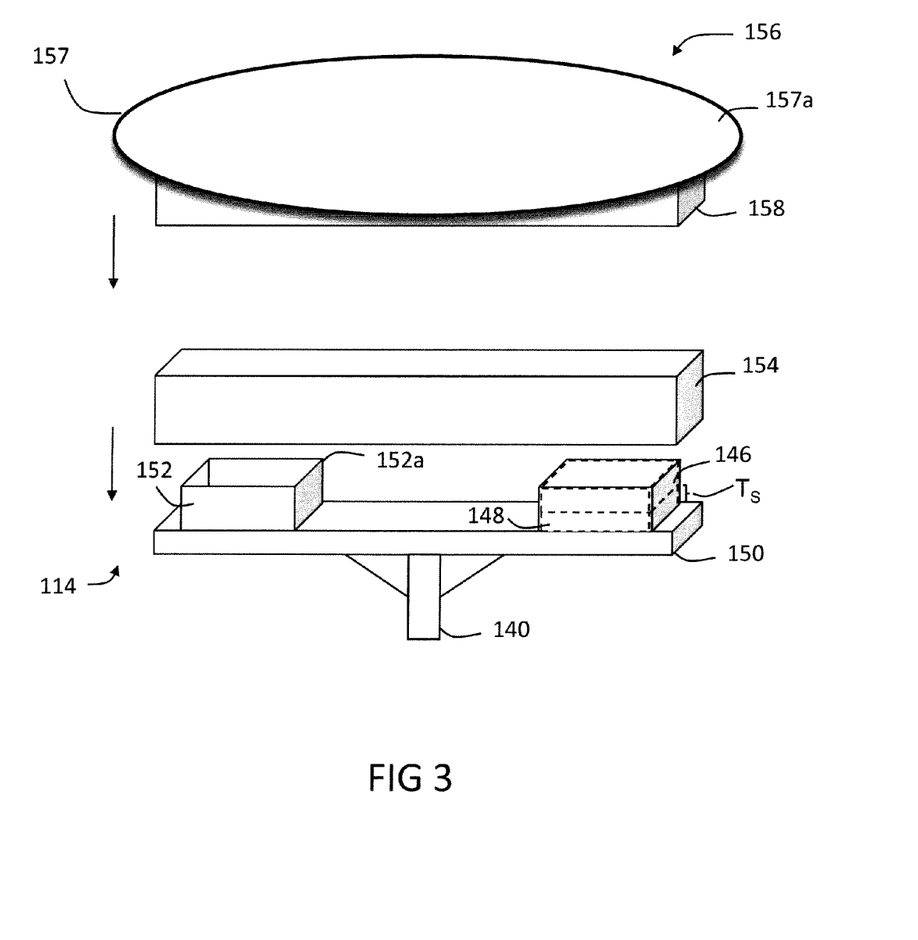
FIG. 3 is an exploded view of a drive head assembly of the device.

Referring now to FIGS. 1-3, the drive head 114 is connected to the body 110, preferably at an end of the housing 130a, by a connector 140 connected to a shaft 142 extending from the motor 112. The drive head 114 can be removably connected to the motor shaft 140 using a snap connector 140, or other quick-disconnect connector, or a pin or set screw 147 can be used to removably secure the drive head to the motor shaft at connection 140. Connection 140 can be "slip free" so as to prevent rotational movement of the drive head 114 relative to the motor 112 thereby transmitting all of the torque provided by the motor to the drive head during operation.

The drive head 114 is preferably elongated having a length L longer that its width W. The length L can be made two or more times longer than the width W. The drive head can be oblong, such as propeller-shaped having a width at it center that is less than the width at either end, rather than being rectangular with one or more pairs of opposite sides being parallel. One or more coupling elements, such as for example magnets 146, are disposed at opposite ends 114a and 114b of the drive head 114 and arranged to coincide with a complimentary arrangement of one or more coupling elements, such as magnets 24, in the remote assembly 116 to provide the magnetic coupling forces coupling the assembly to the drive head.

The connection point 147 to the motor shaft is preferably centrally disposed therebetween to form a centralized axis of rotation about which the drive head 114 is rotated by the motor 112 during operation. The elongated shape of the drive head 114 enables the user to see through the rotating drive head during operation so that he can view the proximate surface 106, and remote surface 102 if the one or more materials 104 are clear or translucent, during surface preparation. This feature enables the user to clearly see his progress as he cleans his aquarium.

As shown in FIG. 3, the drive head 114 can include an elongated beam 150 having magnet cups 152 disposed at each end for holding one or more magnets 146. The magnets 146 can be cylindrical, square, rectangular or other suitable shapes, and even bar magnets, if so desired. An optional spacer 148 having a predetermined thickness $T_S$ can be placed under the magnets 146 to vary the position of the magnet relative to the distal end of the cup 152a which will face the proximate surface 106 during operation, to provide some adjustment of the magnetic force reaching the remote surface preparation assembly 116. This may be particularly useful during manufacture of the device, or it can be done by the user after some disassembly, however, this type of adjustment cannot be made while the device 100 is being operated as provided by the adjustment mechanism described in further detail below. A rectangular cover 154 is secured to the beam 150 to cover the magnet cups 152, the magnets 146, and spacers 148 if used.

An optional detachable proximate surface preparation assembly 156 can be used with the device as well. The proximate surface preparation assembly 156 can include a pad, or disk 157 having a proximate surface preparation surface 157a for use against the proximate surface 106 for surface preparation. The proximate surface preparation assembly 156 also includes a fastener 158 secured to the disk, opposite the surface 157a for securing the assembly 156 to the drive head for movement therewith. In one example, which should not be considered limiting, the fastener 158 can be shaped to fit over the drive head, such as for example by snapping to it. The fastener can have a shape that is complimentary to the shape of the drive head 114, such as for example an elongated shape for fitting in close contact therewith. In this manner, the fastener 158 will prevent slippage between the moving drive head 114 and the assembly 156. The assembly 156 can be easily removable from the drive head 114 so that a variety of different assemblies 156 each having different contact surfaces 157a can be used for achieving different results, grinding, polishing, cleaning, etc. in preparing the proximate surface 106.

In one embodiment which should not be considered limiting, the base 120 is a cup-shaped dome 160 having a closed end 162 connected to the body 110 and an oppositely disposed open end 164. The closed end 162 includes an aperture 166 for receiving the body 110 therethrough such that the first end of the body housing 130a is disposed within the dome 160. The open end of the dome 164 includes a lip or rim 167 forming the support surface 122 for supporting the device 100 against the proximate surface 106 during operation. In this example, the support surface 122 is an annular surface disposed in a support Plane $P_S$ for contacting the proximate surface 106. However, it should be appreciated that the base 120 can include a plurality of spaced apart support surfaces 122 disposed in the support Plane $P_S$ if so desired.

A non-abrasive, slip-inducing material 168, such as felt, among others, can be attached to the rim 167 to provide a non-abrasive support surface 122 to for reducing frictional forces to help the user move the device 110 along the proximate surface 106 and/or prevent scratching this surface.

The base 120 can include one or more open, view-through portions 120a, or clear, view-through portions 120b disposed between the support surface 122 and the body 110 to enable the user to see the proximate surface 106, and remote surface 102 if the material 104 is clear such as an aquarium tank, during operation. The entire base 120 can be clear 120b, if so desired, by forming it from an acrylic or other clear material of suitable strength.

Figure 4:
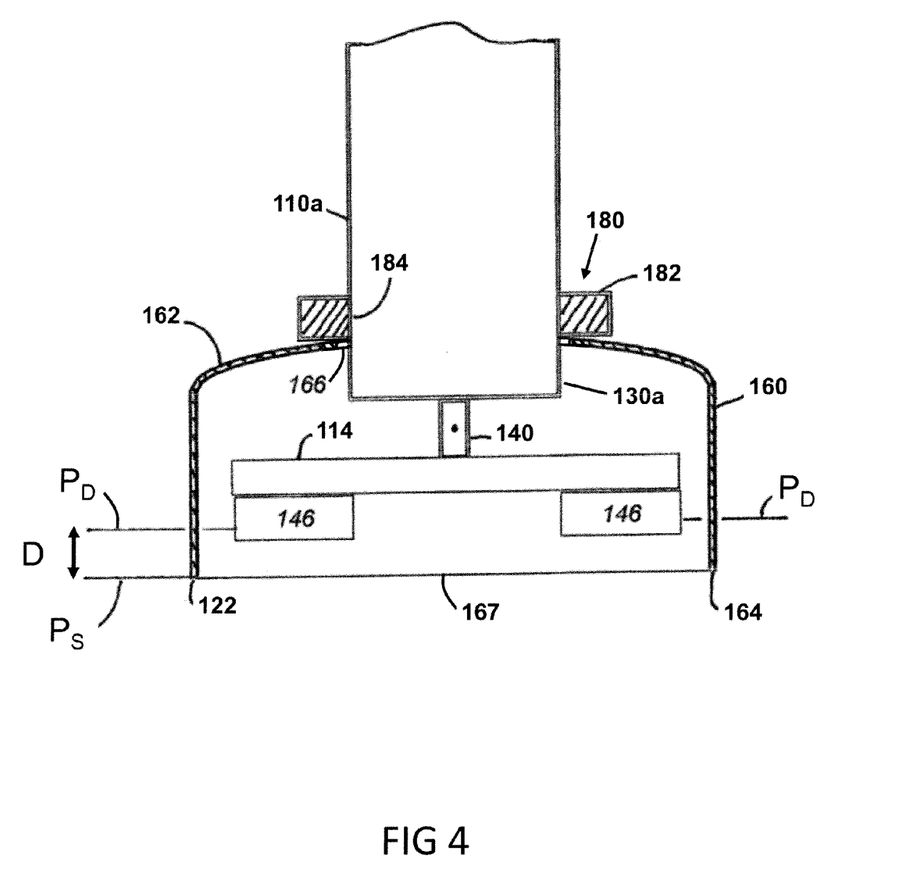
FIG. 4 is a partial sectional view illustrating an magnetic coupling force adjustment mechanism of the device.

Referring now to FIGS. 1 and 4, the device 100 also includes an adjustment mechanism 180 for varying the distance D between the Support Plane $P_S$ and the Drive Plane $P_D$ and fixing it for operation of the device. In one example, which should not be considered, the adjustment mechanism includes an elastic annular member 182, such as for example a rubber grommet, secured to the closed end of the dome 162 in a coaxial relationship to the aperture 166. The annular member 182 includes a radially inner elastic surface 184 for gripping a surface 110a of the body 110 to form a friction fit therewith. The body surface, such as the first end of the housing 130a, or other body surface, referred to hereinafter as 110a, can by cylindrical in shape, or have other shapes suitable for cooperating with the radially inner elastic surface 184 to form the friction fit therebetween. The elastic nature of the annular member 182 provides a radially inwardly directed force against the surface 110a sufficient to prevent slippage between the body 110 and the base 120 to fix drive head magnet 146, disposed in the Drive Plane $P_D$, at a desired distance from the support surface 122, disposed in the Support Plane $P_S$. The body surface 110a can be textured to reduce slippage with the elastic surface 184, if so desired. The body surface 110a can extend to the first end of the body 110 so that the base 120, 160 can be removed from contact with the body so as to be removable. The user can therefore, remove the drive head 114, as explained above, and then remove the base by sliding it off the body. By utilizing a removable base and drive head, the user can attach different bases and drive head, such as ones with different sizes or different magnetic elements, or different applicators, etc. to achieve different results for surface preparation. Further, the different sized bases 120 and drive heads 114 can be used to couple to different sized remote surface preparation assemblies 114 to the device 110 via the complimentary magnetic elements 24 and 146 which preferably should be spaced in a complimentary arrangement within the assembly 116 and drive head 114 to provide optimum coupling therebetween. The device 100 therefore provides an extensive amount of adjustability for the user.

It should be appreciated that, alternatively, the elastic surface 184 of The adjustment mechanism 180 can be formed on the body 110 so as to cooperate with a surface of the base 120, or both these surfaces can be cooperating elastic surfaces, if so desired. Further, the body surface 110a can be a cylindrical surface.

Figure 5:
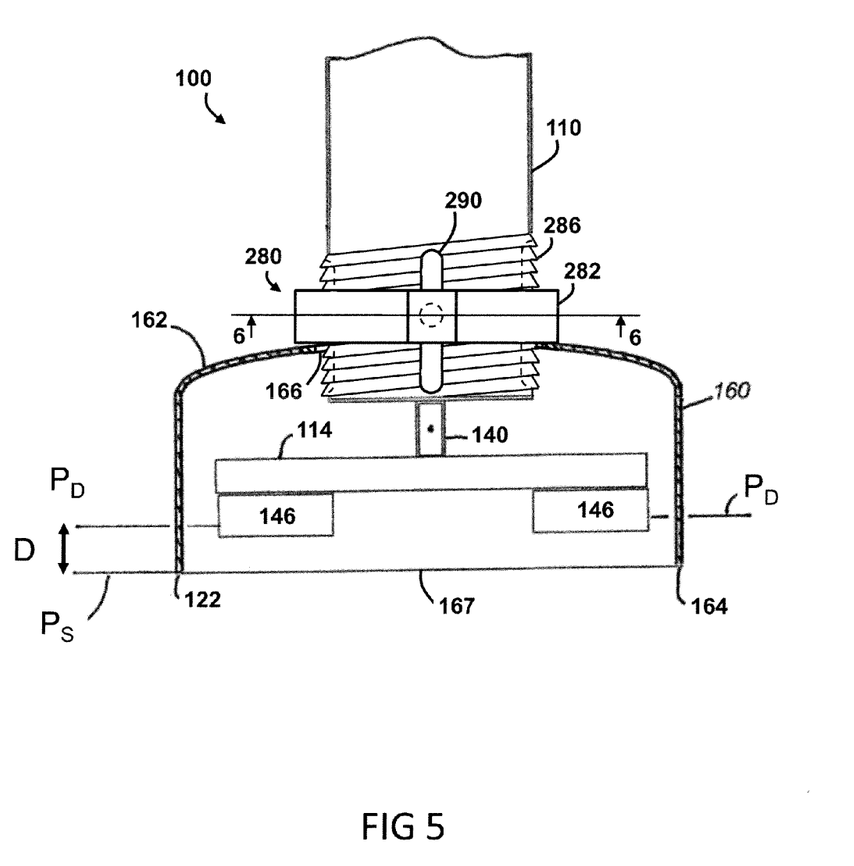
FIG. 5 is a partial side view of an alternate embodiment of the magnetic coupling force adjustment mechanism of the device.
Figure 6:
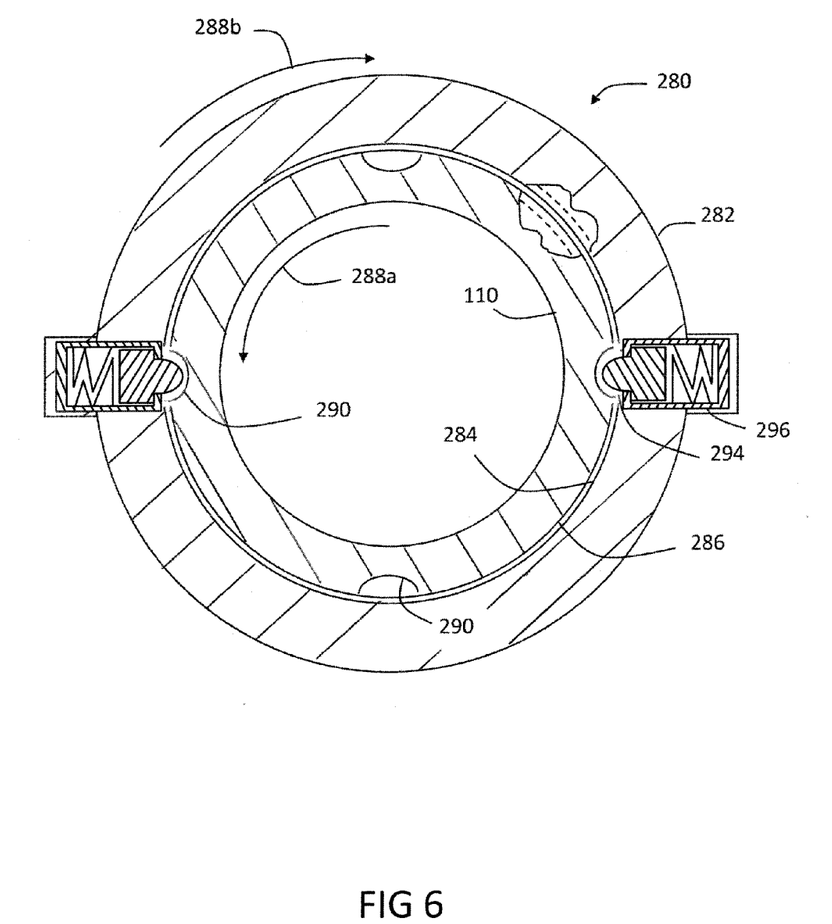
FIG. 6 is a sectional view taken along 6-6 of FIG. 5 illustrating the magnetic coupling force adjustment mechanism of the device.

Referring now to FIGS. 5 and 6, another embodiment of the adjustment mechanism is shown generally at 280. The adjustment mechanism includes an annular collar 282 extending from the base 110 and encircling a portion of the body 110. The collar 282 includes a radially inner threaded surface 284 cooperating with a threaded surface 286 formed on the body 110. The threaded body surface 286 can be cylindrical.

Rotation of at least one of the base and/or body relative to the other along the cooperating threaded surfaces 284, 286, as shown by arrows 288a and 288b, moves the base 160 and/or body 110 in an orthogonal direction thereby moving the drive head 114, and the drive head magnets 146 disposed in the Drive Plane $P_D$, towards or away from the support surface 122 disposed in the Support Plane $P_S$, varying the distance D. The threaded base surface 286 can extend to the end of the body 110 so that the base 120, 160 can be removed therefrom by the cooperating threads 284, 286.

The adjustment mechanism 280 also includes one or more elongated recesses 290 formed in the threaded surface 286 formed on the body. In one example, which should not be considered limiting, the elongated recesses 290 can extend at approximately right angles with respect to the threads 286. Several recesses can be spaced apart around the outer circumference of the threaded surface 286. The adjustment mechanism 282 also includes one or more protruding elements 294 disposed in the collar 282, each being biased radially inwards by a spring 296 so as to extend into the recess(es) 290 thereby fixing the movable drive head 114 a desired distance from the support surface 122, and fixing distance D, for operation of the device 100. It should be appreciated that, alternatively, the one or more recesses 290 can be formed in the threaded surface 284 formed on the collar 282 (and thus the base 120,160) and the protruding element(s) 294 can be disposed in the body 110 and biased radially outwardly towards to recesses if so desired.

The adjustment mechanism 180 enables the user to vary the distance between the support surface 122, disposed in the support plane $P_S$, and the drive head magnetic 146, disposed in the drive head plane $P_D$, by moving the base 120 with respect to the body 110 and fixing it there in the desired position.

By enabling the user to adjust the distance D between the drive head magnet 146 and the support surface 122, the adjustment mechanism 180 allows the user to vary distance between the drive head magnet(s) 146 and the proximate surface 106 contacting the support surface 122 and consequently the distance between the drive head magnet and the remote surface preparation assembly magnet(s) 24. In this manner, the device 100 allows the user to quickly and easily vary the magnitude of the coupling force between the drive head 114 and the remote surface preparation assembly 116. This enables the device 100 to be used on a variety of different materials 104, each of which may affect the magnetic coupling forces extending through them by different amounts. The adjustment feature also enables the device 100 to be used on materials of different thicknesses. If the device 100 is to be used on a thicker material, having a greater distance between the remote surface and the proximate surface, the user can reduce the distance between drive head and the support surface to provide a suitable coupling force proper operation.

The adjustment mechanism 180, 280 also enables the user to adjust the magnetic coupling force coupling the remote surface preparation assembly 116 to the drive head 114 while operating the device. Thus, if the rotating remote surface preparation assembly 116 starts to slow down during operation, which may result for example by encountering a build of coralline algae or other materials on the interior of the aquarium tank, the user can reduce the magnetic coupling force by increasing the distance between the drive head and the support surface which will allow the remote assembly to increase its rate of rotation to improve its ability to clean/remove the material. By reducing the magnetic coupling force in this manner, the frictional forces between the remote surface, preparation assembly 116 and the remote surface 102 can be reduced which will allow the motor's rotational rate (rpms) to increase thereby rotating the assembly 116 faster. By adjusting the magnetic coupling force as described, the adjustment mechanism 180, 280 can be used to adjust the forces applying the load on the motor (the torque load on the motor) which in turn adjust the rate of rotation of the motor 112. This adjustment features, coupled with the device's see-through base and rotating drive head enables the user to clean an aquarium more effectively than conventional cleaning devices.

The cup-shaped dome/base 160 with its annular contact surface 122 helps to stabilize the device during use. Further, the dome 160 protects the spinning drive head 114, disposed within the dome, from unintentional contact of foreign objects, and also allows for adjustment of the magnetic field between the driving head and driven remote disk 116 as described above. This device with its features described herein make the task of cleaning and polishing aquarium surfaces easier, faster, and more efficient.

The invention has been described with reference to one or more example embodiments. Obviously, alterations and modifications will occur to others upon a reading and understanding of this specification. It is intended to include all such modifications and alternations insofar as they come within the scope of the appended claims or the equivalents thereof.

What is claimed is:

1. A surface preparation device for preparing material having a remote surface and a spaced apart proximate surface comprising:
   a remote surface preparation assembly having a body with a coupling element and a first end for contacting the remote surface for preparing the first surface;
   a base having one or more support surfaces for contacting the proximate surface and a view-through portion;
   a drive head including an elongated member having opposite ends and a centrally disposed motor connection point, the elongated member having a coupling element at each of the opposite ends providing a magnetic attractive force for attracting the remote surface preparation assembly coupling element thereby coupling the remote surface preparation assembly to the drive head for remote actuation, wherein at least one of the drive head coupling element and the remote surface preparation assembly coupling element is a magnet;
   a body housing movably connected to the base and having a handle portion for gripping the surface preparation device during operation; and
   a motor disposed within the body housing and connected to the motor connection point rotating the elongated drive head within the base thereby enabling a user to see at least one of the proximate surface and the remote surface through the view-through portion and the rotating elongated drive head during operation.

2. The surface preparation device defined in claim 1 further comprising an adjustment mechanism having a first surface secured to the housing cooperating with a second surface secured to the base movably connecting the housing to the base varying the distance between the drive head coupling elements and the one or more support surfaces.

3. The surface preparation device defined in claim 1 wherein the base comprises a cup-shaped dome having an open end with one or more rim surfaces forming the one or more support surfaces and the view-through portion is an open portion in the dome or a clear portion of the dome.

4. The surface preparation device defined in claim 1 wherein the base is clear.

5. The surface preparation device defined in claim 1 wherein the view-through portion is open.

6. The surface preparation device defined in claim 1 wherein the view-through portion is a clear material.

7. The surface preparation device defined in claim 1 wherein base is acrylic.

8. The surface preparation device defined in claim 1 wherein the drive head is an elongated beam having magnet cups disposed at each end holding one or more magnets.

9. The surface preparation device defined in claim 8 further comprising spacers having a pre-determined thicknesses disposed in the magnet cups for providing an adjustment of the magnetic attractive force coupling the remote surface preparation assembly to the drive head.

10. The surface preparation device defined in claim 1 further comprising a proximate surface preparation assembly having a fastener detachably secured to the drive head for rotation therewith and a contact surface for preparing the proximate surface during rotation.

11. The surface preparation device defined in claim 1 further comprising the remote surface preparation assembly body is disk shaped with a center thickness and a tapered radially outer end of reduced thickness less than the center thickness for reducing turbulence as the remote surface preparation assembly body rotates.

12. A power operated surface preparation tool for preparing material having a remote surface and an oppositely disposed proximate surface spaced apart from the remote surface comprising:
   a remote surface preparation assembly having an application surface, for preparing the remote surface, the assembly having at least one magnetic element;
   a body having a drive head disposed at a first end, the drive head having at least one drive head magnetic element providing a magnetic coupling force for attracting the surface cleaning assembly magnetic element to couple the surface cleaning assembly to the drive head for remote actuation, and the body housing having a handle portion for gripping the device during operation;
   a motor mounted within the body housing and connected to the drive head for moving the at least one drive head magnetic element along a drive plane thereby moving the remote surface preparation assembly via the magnetic coupling force; and
   a base having one or more support surfaces disposed in a support plane for contacting the proximate surface and an aperture receiving the body housing therethrough, the base movably connected to the body housing for movement relative thereto for varying the distance between the drive plane and the support plane.

13. The power operated surface preparation tool defined in claim 12 further comprising an elastic member fixed to the base and having a surface providing a movable friction fit with the body housing or fixed to the body housing and having a surface providing a moveable friction fit with the base for fixing the base to the body housing at a plurality of different positions each having a different distance between the drive plane and the support plane.

14. The power operated surface preparation tool defined in claim 13 wherein the elastic member is an annular member fixed to the base in a coaxial relationship to the aperture and having a radially inner elastic surface providing a moveable a friction fit with the body housing.

15. The power operated surface preparation tool defined in claim 12 further comprising a spring biased protruding element cooperating with a recess formed on the base or the body housing fixing the base to the body housing at the plurality of different positions each having a different distance between the drive plane and the support plane.

16. The power operated surface preparation tool defined in claim 12 further comprising a threaded surface formed on the body housing cooperating with a threaded surface formed on the base for varying the distance between the drive plane and the support plane and further comprising a spring biased protruding element cooperating with an elongated recess extending into one of the threaded surfaces and extending perpendicular to the threads thereof for fixing the base to the body housing at a plurality of different positions each position providing a different distance between the between the drive plane and the support plane.

17. The power operated surface preparation tool defined in claim 16 further comprising a plurality of circumferentially space recesses extending into one of the threaded surfaces and extending perpendicular to the threads thereof cooperating with the protruding element for fixing the base to the body housing at the plurality of different positions.

18. The power operated surface preparation tool defined in claim 12 wherein the base is a cup-shaped dome having a first end connected to the body housing and the one or more support surfaces are one or more rim surfaces of the cup-shaped dome.

19. The power operated surface preparation tool defined in claim 12 wherein the elongated member has a length and a width and the length is two or more times longer than the width.

20. The power operated surface preparation tool defined in claim 12, the drive head further comprising an elongated member having opposite ends a centrally disposed motor connection point and at least one drive head magnetic element disposed at the opposite ends.

21. A power tool for cleaning an interior surface of an aquarium comprising:
 a remote surface cleaning assembly having a body with at least one magnetic element connected thereto and a first end for contacting the interior surface of the aquarium;
 a body housing having a drive head including an elongated member with opposite ends and a centrally disposed motor connection point disposed at a first end of the housing, the drive head having a magnetic element disposed at the opposite ends providing a magnetic coupling force for attracting the surface cleaning assembly magnetic element to couple the surface cleaning assembly to the drive head for remote actuation;
 a motor mounted within the body housing and removably connected to the drive head for rotating the drive head and drive head magnetic element thereby moving the remote surface cleaning assembly via the magnetic coupling force; and
 a base connected to the body housing, the base having a support end for contacting an exterior surface of the aquarium and a view-through portion enabling a user to see the interior surface through the view-through portion and the rotating elongated drive head member during operation, the base further comprising an adjustment surface cooperating with the body housing for fixing the base to the body housing at a plurality of different positions, each position providing a different distance between the base support end and the drive head magnetic element.

22. The power tool defined in claim 21 further comprising one or more LEDs extending from the remote surface cleaning assembly body.

\* \* \* \* \*